(12) United States Patent
Mifune

(10) Patent No.: US 7,543,246 B2
(45) Date of Patent: Jun. 2, 2009

(54) IMAGE DISPLAYING PROGRAM PRODUCT AND AN IMAGE DISPLAYING APPARATUS

(75) Inventor: Eiji Mifune, Osaka (JP)

(73) Assignee: Kyocera Mita Corporation (JP)

( * ) Notice: Subject to any disclaimer, the term of this patent is extended or adjusted under 35 U.S.C. 154(b) by 671 days.

(21) Appl. No.: 10/683,503

(22) Filed: Oct. 10, 2003

(65) Prior Publication Data

US 2004/0083241 A1    Apr. 29, 2004

(30) Foreign Application Priority Data

Oct. 23, 2002    (JP)    ............... 2002-308789

(51) Int. Cl.
G06F 3/048    (2006.01)

(52) U.S. Cl. ............... 715/838; 715/273; 715/274; 715/277; 715/819; 715/820; 715/827; 715/829; 707/200

(58) Field of Classification Search ............... 707/526, 707/200; 715/829, 517, 819, 820, 837, 838, 715/273, 274, 277, 827
See application file for complete search history.

(56) References Cited

U.S. PATENT DOCUMENTS

| | | | | |
|---|---|---|---|---|
| 5,835,094 A | * | 11/1998 | Ermel et al. ............... | 715/848 |
| 6,243,724 B1 | * | 6/2001 | Mander et al. ............... | 715/526 |
| 6,466,237 B1 | * | 10/2002 | Miyao et al. ............... | 715/838 |
| 6,944,819 B2 | * | 9/2005 | Banatwala et al. ........... | 715/526 |
| 7,023,569 B2 | * | 4/2006 | Kizaki ............... | 358/1.13 |
| 2001/0028363 A1 | * | 10/2001 | Nomoto et al. ............... | 345/748 |
| 2002/0038322 A1 | * | 3/2002 | Iijima ............... | 707/526 |
| 2003/0033296 A1 | * | 2/2003 | Rothmuller et al. ........... | 707/3 |
| 2003/0056178 A1 | * | 3/2003 | Sato ............... | 715/527 |

FOREIGN PATENT DOCUMENTS

JP    2001-084246    3/2001

OTHER PUBLICATIONS

Mander et al. "A 'Pile' Metaphor for Supporting Casual Organization of Information", May 3-7, 1992, pp. 627634.*

* cited by examiner

Primary Examiner—Weilun Lo
Assistant Examiner—Tuyetlien T Tran
(74) Attorney, Agent, or Firm—Gerald E. Hespos; Anthony J. Casella

(57) ABSTRACT

To enable a user to grasp the detailed contents of respective files constituting a file group by allowing the user to view index images representing the file group along with file information, a data reader judges the file to which the on-screen index image belongs, and the page number of the page represented by the index image in the file, and displays file information relating to the judged file and the judged page number when the index image is displayed by an image display controller.

6 Claims, 14 Drawing Sheets

IMAGE DISPLAYING PROGRAM PRODUCT AND AN IMAGE DISPLAYING APPARATUS

FIELD OF THE INVENTION

The present invention relates to a technology of generating index images of files stored in a storage medium to display index images on a screen of an image displaying apparatus.

BACKGROUND OF THE INVENTION

Conventionally, there has been known an image displaying apparatus for generating index images or thumbnail images judged by reducing the sizes of respective original images of a plurality of document data and image data stored in a storage medium such as a hard disk in a computer or an optical disk, and displaying a list of generated index images on a display device, and a storage medium storing an image displaying program product for implementing the above processing.

There is known an image displaying apparatus and image displaying program product, wherein a certain number of files represented by index images are linked to one another and hypothetically treated as a file group in response to designation of a plurality of index images on the display device by a user while the index images are displayed on the display device, and an index image representing the file group is displayed on the display device along with the total number of files constituting the file group.

In the above arrangement, only respective leading pages of files constituting the file group are displayed as index images on the display device. Accordingly, a user cannot grasp the detailed contents of the respective files.

SUMMARY OF THE INVENTION

It is an object of the present invention to provide an image displaying program product and an image displaying apparatus which are free from the problems residing in the prior art.

It is another object of the present invention to provide an image displaying program product and an image displaying apparatus that facilitate a user to grasp the detailed contents of respective files constituting a file group upon viewing a list of index images representing the files.

According to an aspect of the invention, a file group is generated by linking a plurality of files stored in the storage medium to one another, and an image on a page of each of the files constituting the file group is displayed as an index image on a display device. It is performed to judge a file in connection with the displayed index image, and what number the page serving as the index image is with respect to a predetermined reference. The judged file and page number are displayed as file information together with the index image.

With this arrangement, a user can easily grasp such file information as the page number of the page represented by the index image in the file or file group and the file number of the file in the file group by viewing the display device. Thus, the user can grasp the contents of the respective files constituting the file group more quickly and in more detail as compared with the conventional technology.

These and other objects, features and advantages of the present invention will become more apparent upon reading of the following detailed description along with the accompanying drawings.

DETAILED DESCRIPTION OF THE PREFERRED EMBODIMENTS OF THE INVENTION

Figure 1:
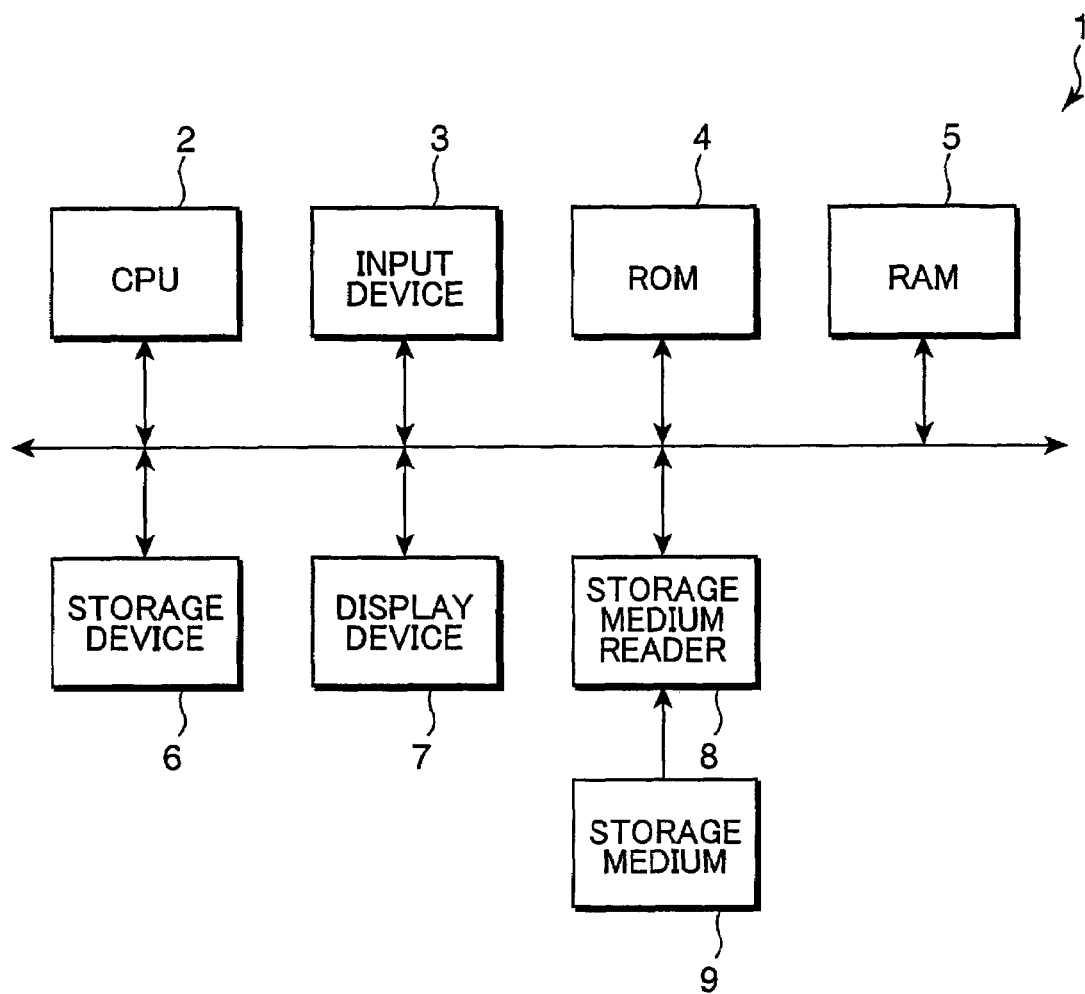
FIG. 1 is a block diagram showing a schematic construction of an image displaying apparatus according to an embodiment of the invention.

An image displaying apparatus and an image displaying program product according to an embodiment of the present invention are described. Referring to FIG. 1, an image displaying apparatus 1 is constituted by a personal computer or the like. The image displaying apparatus 1 is provided with a CPU 2 for controlling the operation of the entire apparatus, and an input device 3, a ROM 4, a RAM 5, a storage device 6, a display device 7 and a storage medium reader 8 connected with the CPU 2 via an internal bus. Various data are inputted and outputted between the respective elements via the internal bus under the control of the CPU 2, whereby various operations are carried out.

The input device 3 is comprised of a keyboard, a mouse, or the like to enable the user to input instructions for operations. A system program for controlling the operation of the entire apparatus and the like are stored in the ROM 4. The storage device 6 is comprised of a hard disk drive or the like, and an image displaying program or the like stored in a detachable storage medium is writable therein.

The CPU 2 reads the image displaying program and the like from the storage device 6 and carries out its processing to control the operations of the respective blocks. The RAM 5 is used as a work area of the CPU 2. The display device 7 is constructed by a CRT or a liquid crystal display device to display various screen images under the control of the CPU 2.

The image displaying program is written in the storage device 6 from a detachable storage medium or recordable medium 9 such as a CD-ROM or a floppy disk (FD) using the storage medium reader 8 including a disk drive or the like. In the case that the image displaying apparatus 1 is connected with another computer or the like via a network, the image displaying program and the like may be downloaded from this computer or the like via the network.

In general, the routines executed to implement the operations, whether implemented as part of an operating system or a specific application, component, program, object, module or sequence of instructions will be referred to as "programs". The program comprises one or more instructions that are resident at various times in various memory and storage devices in a computer, and that cause the computer to perform the steps necessary to execute steps or elements embodying the various aspects of the invention.

The embodiment of the invention has and will be described in the context of functioning the computer and computer system. However, those skilled in the art will appreciate that various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other detachable disks, hard disk drives, optical disks (e.g., CD-ROM's, DVD's, etc.), among others, and transmission type media such as digital and analog communication links, including the Internet.

Figure 2:
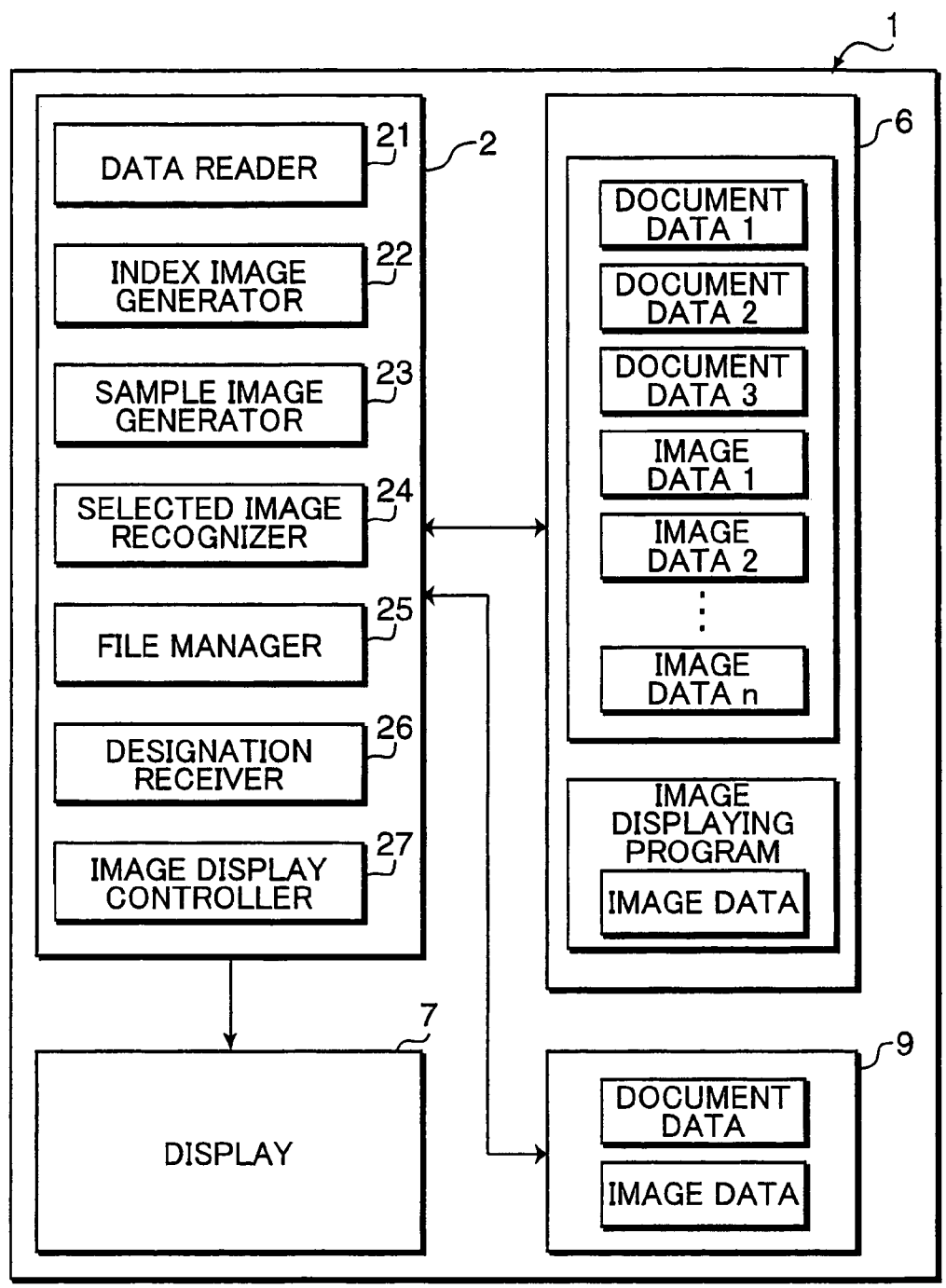
FIG. 2 is a block diagram showing main functions of the image displaying apparatus.
Figure 3:
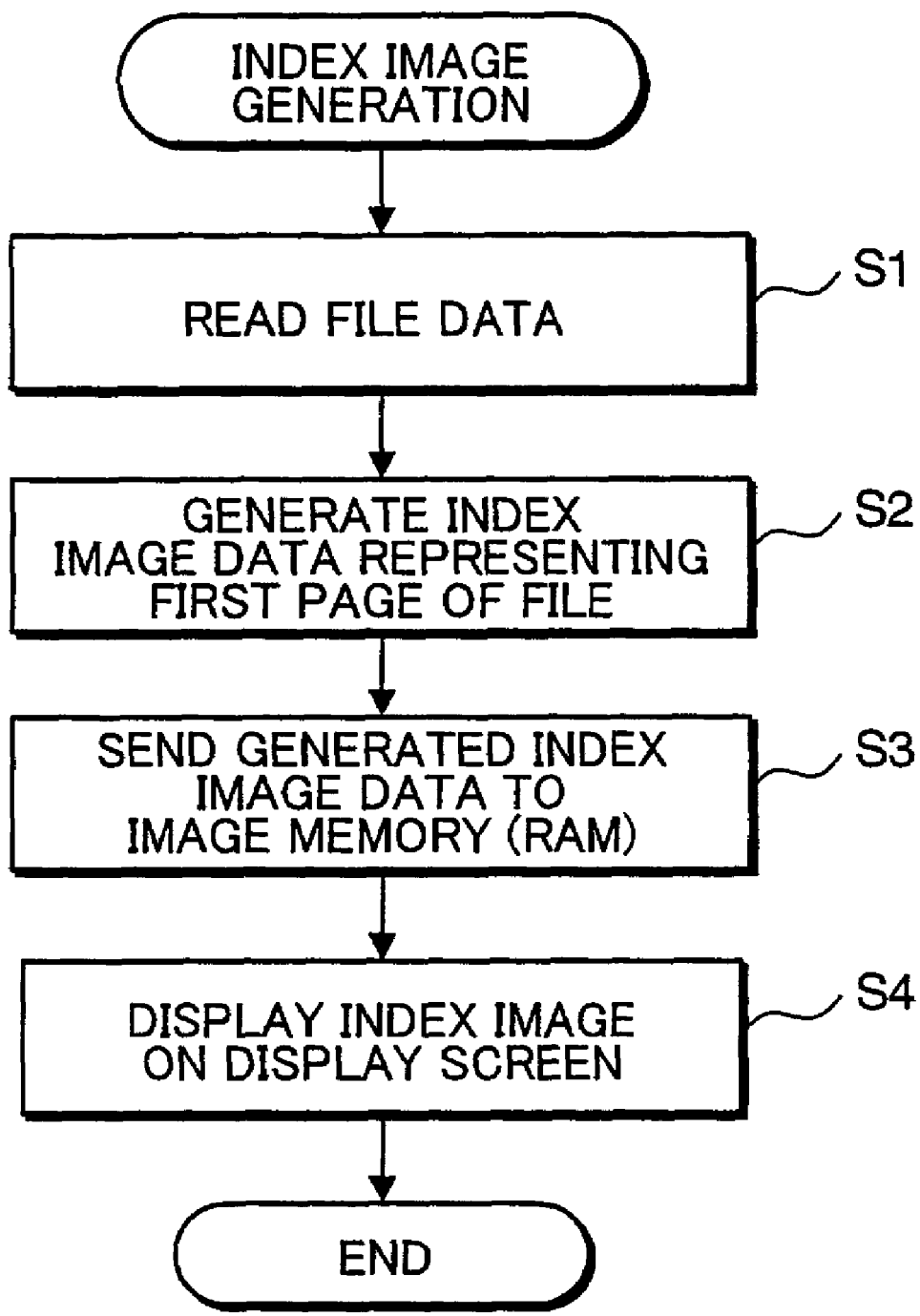
FIG. 3 is a flowchart showing a processing of generating respective index images of files constituting a file group.

Next, main functions of the image displaying apparatus 1 thus constructed are described. As shown in FIG. 2, the CPU 2 functions as a program executing device in accordance with the image displaying program stored in the storage device 6 in the image displaying apparatus 1.

In the embodiment, readable are document data 1, 2, 3 in a text format or the like, and image data 1 through n in PDF format, JPEG format, or the like stored in the storage device 6. The document data and the image data to be read may be stored in the storage medium 9. Throughout the specification, document data and image data, and all the other data handled by the inventive program product and the inventive image displaying apparatus are simply called as "file data". The CPU 2 generates index images or thumbnail images by reducing the original sizes of the document data and image data read from the storage device 6 to respective prejudged sizes. The thus generated index images are temporarily transmitted to the RAM 5 (not illustrated in FIG. 2) functioning as an image memory for displaying the index images on the display device 7.

The CPU 2 functions as a data reader 21, an index image generator 22, a sample image generator 23, a selected image recognizer 24, a file manager 25, a designation receiver 26, and an image display controller 27. The data reader 21 reads, based on a command of the image displaying program in the storage device 6, file data including document data, image data, etc. stored in the storage medium 9 or the storage device 6, as well as the file information attached to the file data. The file information relates to the kind of software application for opening the relevant file, the size of sheet for printing the file, the total number of pages constituting the file, the format of the file to which the on-screen index image belongs, the page number of the page represented by the index image in the file, etc. The index image generator 22 generates index images based on the file data read by the data reader 21 in the form of a page with respect to the respective files. The sample image generator 23 generates a sample image, which will be described later. The selected image recognizer 24 recognizes the selected index image(s) from the index images displayed on the screen of the display device 7. The file manager 25 specifies the files represented by the respective index images which are recognized by the selected image recognizer 24, and hypothetically integrates the selected files into a file group by electronically linking the selected files to one another. The designation receiver 26 receives designation of the page(s) and/or the file(s) from the user. The image display controller 27 displays an index image along with file information including a sample image at their respective positions on the screen of the display device 7.

The index image generator 22 generates an index image or thumbnail image which allows a user to recognize the contents of a file by reducing the size of the file data read from the storage device 6 or from the detachable storage medium 9. Specifically, the index image generator 22 generates an index image representing the leading page of a designated file or a designated page in response to receiving designation of the file or page, designation such as the page number throughout the total number of pages of the file group, from a user via the designation receiver 26.

The sample image generator 23 generates a sample image by reading sample image data from a sample image data storage device in the image displaying program. The sample image includes an image that enables a user to visibly recognize the type or format of a file (e.g., in this embodiment, an image in a reduced size is adopted so that a user can promptly recognize the kind of a software application for opening the file. See SA1 in FIG. 10), and an image that facilitates a user to recognize that the file group consists of a plurality of files (e.g., in this embodiment, adopted is a pictorial image such as a clip that makes it easy for the user to recognize that the file group consists of a plurality of files. See SA2 in FIG. 12).

The file manager 25 hypothetically treats the respective files represented by the selected index images as a group of files by electronically linking the file data to one another in response to recognition of the plurality of index images selected by the user via the selected image recognizer 24. In this embodiment, the file manager 25 treats each file represented by the selected index image as a file irrespective of the difference in category or format of the file and the kind of software application to be used in opening the file.

First, described is a basic processing of generating index images of files stored in the storage device 6 or the like. In the processing of generating index images, first, the file data stored in the storage device 6 or the like is read (Step S1). At this stage, file data corresponding to the first page of the file is read if the file consists of a number of pages. An index image is generated by reducing the size of the read original file data to a certain size (Step S2). The data of the generated index image is transmitted to the RAM 5 or image memory (Step S3), and the index image is displayed on the screen of the display device 7 (Step S4). The above operations are implemented with respect to each file stored in the storage device 6 or the like.

Figure 4:
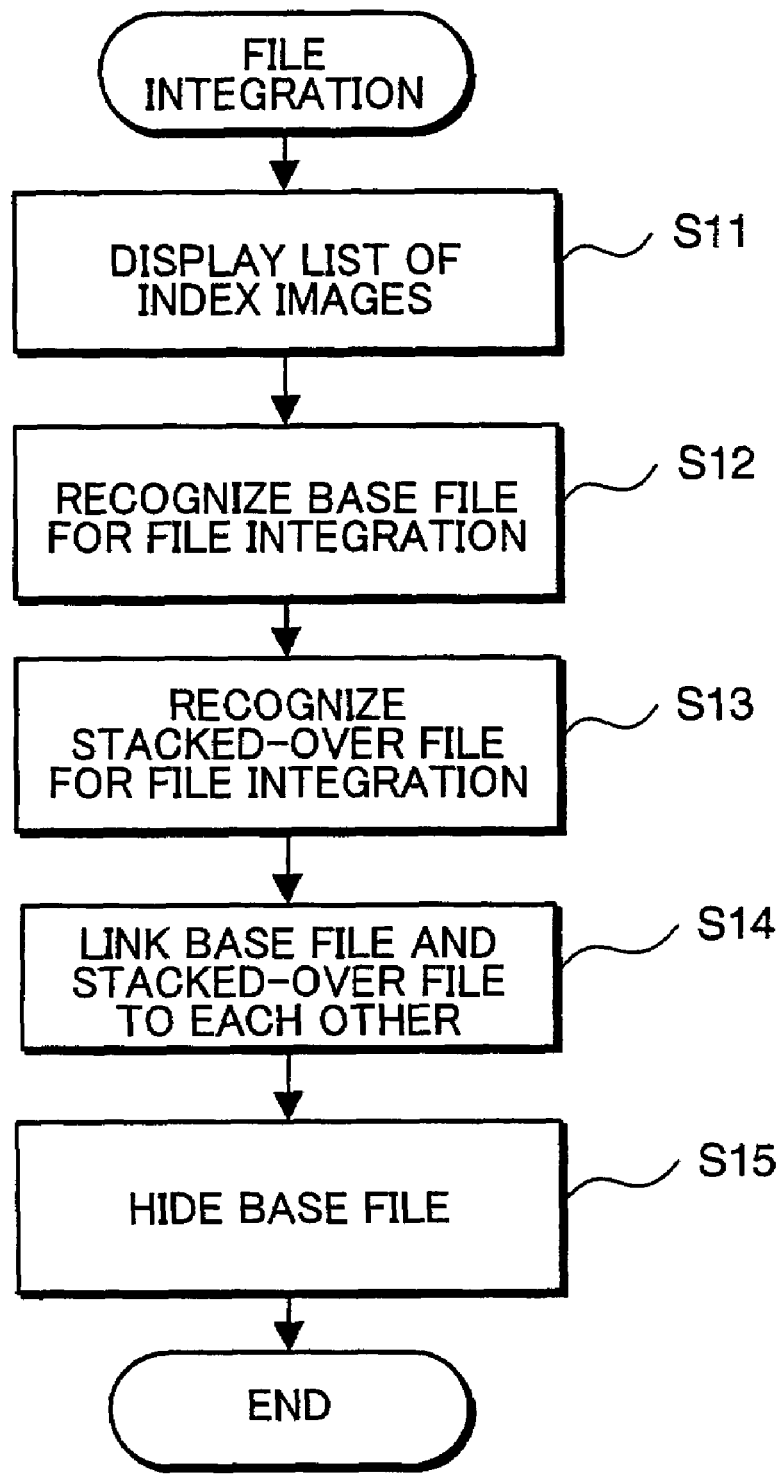
FIG. 4 is a flowchart showing a processing of integrating a plurality of files into a file group.
Figure 5A:
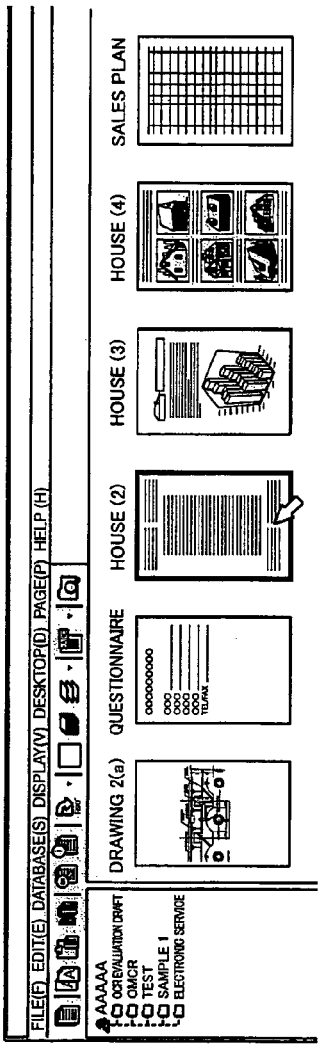
FIGS. 5A and 5B are examples of screen images illustrating how files are selected and integrated in a file integration processing.
Figure 5B:
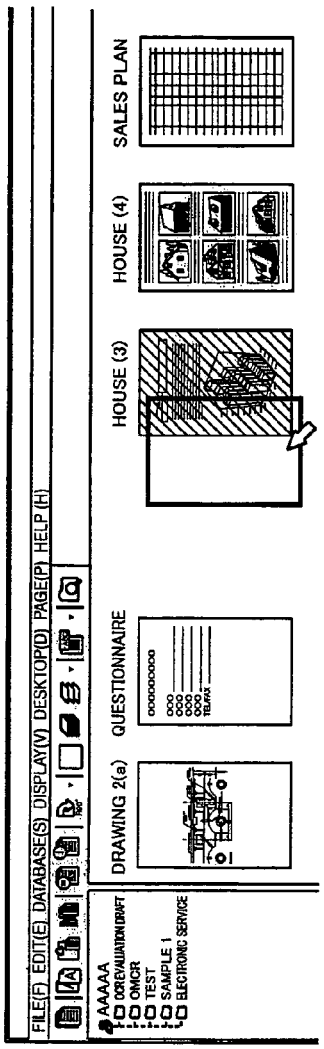
Figure 5C:
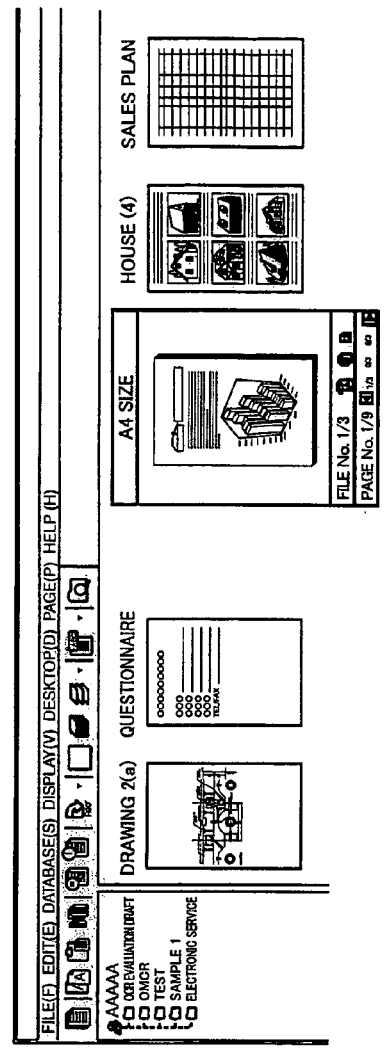
FIG. 5C is an example of a screen image illustrating how an index image is displayed after the file integration processing.

Next, a processing of integrating or stacking a number of files is described. FIG. 4 is a flowchart showing the file integration processing. FIGS. 5A and 5B are examples of screen images illustrating how files are selected and integrated in the file integration processing. FIG. 5C is an example of a screen image illustrating how an index image is displayed after the file integration processing.

Referring to FIG. 4 showing a flowchart of the file integration processing, first, a list of index images of respective files stored in the storage device 6 or the like are displayed on the screen of the display device 7 (Step S11). At this stage, when a user selects a file by, for example, clicking the left side of a mouse pointer on a on-screen index image representing the desired file, the selected file is recognized as a base file in the file integration processing (Step S12), and the selected index image is displayed in a bold frame (see FIG. 5A).

Then, when the user moves the selected index image onto another index image by e.g., the so-called "drag-and-drop" operation, the file represented by the index image which the user wishes to integrate with the base file is recognized as a stacked-over file (Step S13). At this stage, the index image representing the stacked-over file is displayed in a different color from the index image representing the base file, for example (see FIG. 5B). After recognition of the stacked-over file, the two files (base file and the stacked-over file) are electronically linked to one another (Step S14).

Specifically, these two files are hypothetically treated as a file group by electronically linking the file data to one another. In the file integration processing, stored is information relating to the total number of files constituting the file group, the total number of pages of the file group, and the like. In the case of displaying index images of respective files constituting a file group in the form of a page, for example, the index images representing the respective pages of each file can be successively displayed in a "seamless" manner, namely, as a bundle, irrespective of the difference in category or format of the file.

After Step S14, the index image representing the base file selected in Step S12 is hidden (Step S15), and a single index image is displayed as if the plurality of files including the base file and the stacked-over file are integrated with one another (see FIG. 5C). As shown in FIG. 5C, it is preferable to display the index image after the file integration processing in such a manner that the files are integrated into a group of files in a stacked manner. Alternatively, the index image representing the stacked-over file may be hidden, in place of the index image representing the base file. The processing as to how various file information to be displayed along with an index image are acquired and displayed will be described later.

Figure 6:
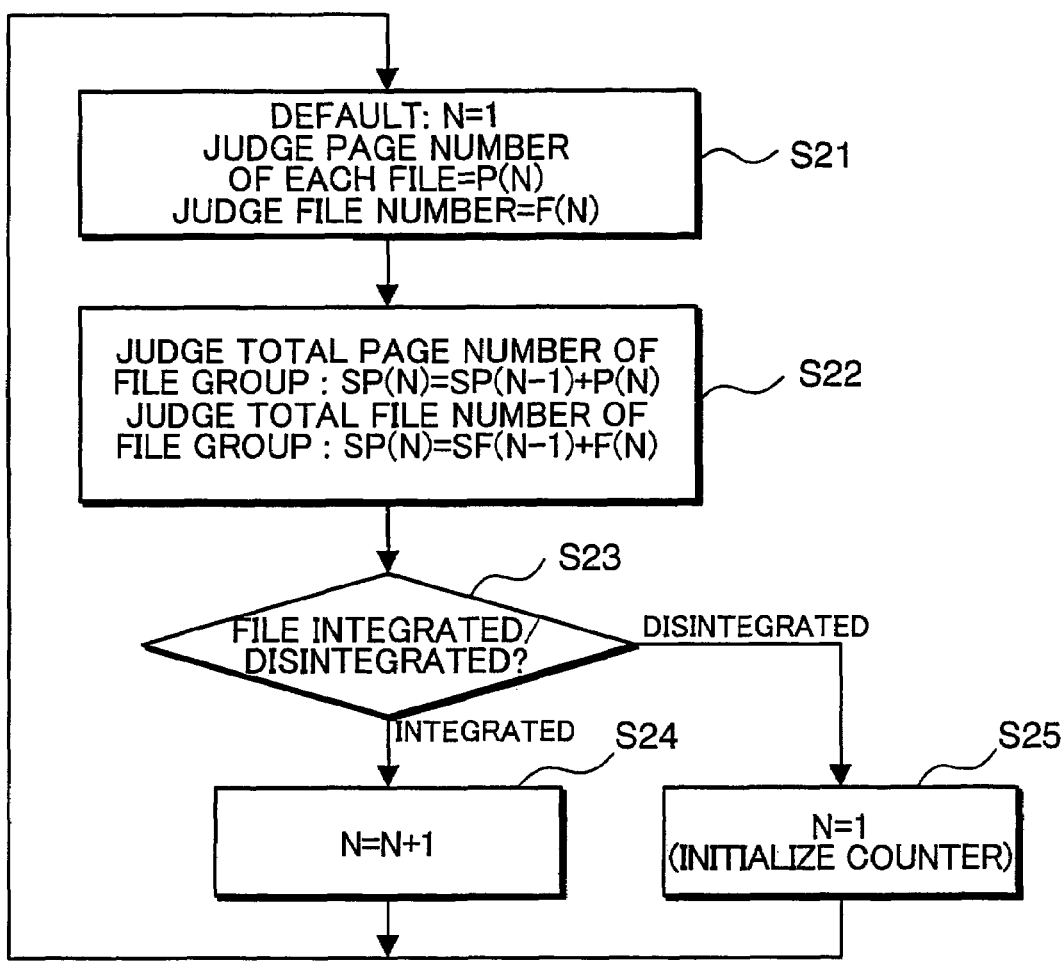
FIG. 6 is a flowchart showing a processing of acquiring information relating to the total file number and the total page number of a file group judged by integrating a plurality of files.

In the following, described is the processing of acquiring information relating to the total file number and the total page number of the file group after the file integration processing is implemented. FIG. 6 is a flowchart showing the processing. First, the number of files F(N) constituting a file group is judged, as well as the number of pages P(N) of the file group (Step S21). At this stage, the default of the file integrating counter N is set at 1.

Next, the total page number of the files constituting the file group is calculated based on the equation: SF(N)=SF(N−1)+F(N) (Step S22). At this step, in the case where the file group consists of a single file, for instance, the number of pages P(1) of the single file and the number of files F(1) are set as the total number of pages SP(1) and the total number of files SF(1), respectively.

Then, it is judged whether file integration processing has been implemented or file disintegration processing has been implemented (Step S23). If it is judged that the file integration processing has been implemented in Step S23, the value of the file integrating counter N is incremented as: N=N+1 (Step S24), and the routine goes back to Step S21. As a result of implementing the file integration processing, the number of files constituting the file group is incremented by one. Then, the operation in Step S21 is implemented on the basis of N=2. Thus, the number of files F(2) and the number of pages P(2) are judged with respect to the added second file. Subsequently, in Step S22, the total number of files constituting the file group is calculated as SF(2)=2 because another file (the number of file F(2)=1) is added to the total number of files SF(1)=1. As regards the page number, the total number of pages SP(2) is calculated by adding the number of pages P(2) constituting the second file to the total number of pages of the file(s) constituting the file group before the file integration processing of the second file is implemented (namely, SP(2)=P(2)+SP(1)). Specifically, if the total number of pages SP(1) is 5, and the number P(2) of the second file is 3, the total number of pages SP(2) becomes 8. By cyclically repeating a series of the above operations, the total page number and the total file number of the file group are calculated each time the file integration processing is carried out.

Referring back to Step S23, if it is judged that the file integration processing has not been implemented, namely, file disintegration processing is implemented, a processing of acquiring information relating to the total file number and the total page number of the file group, which is specific to the file disintegration processing, is implemented (Step S25).

Figure 7:
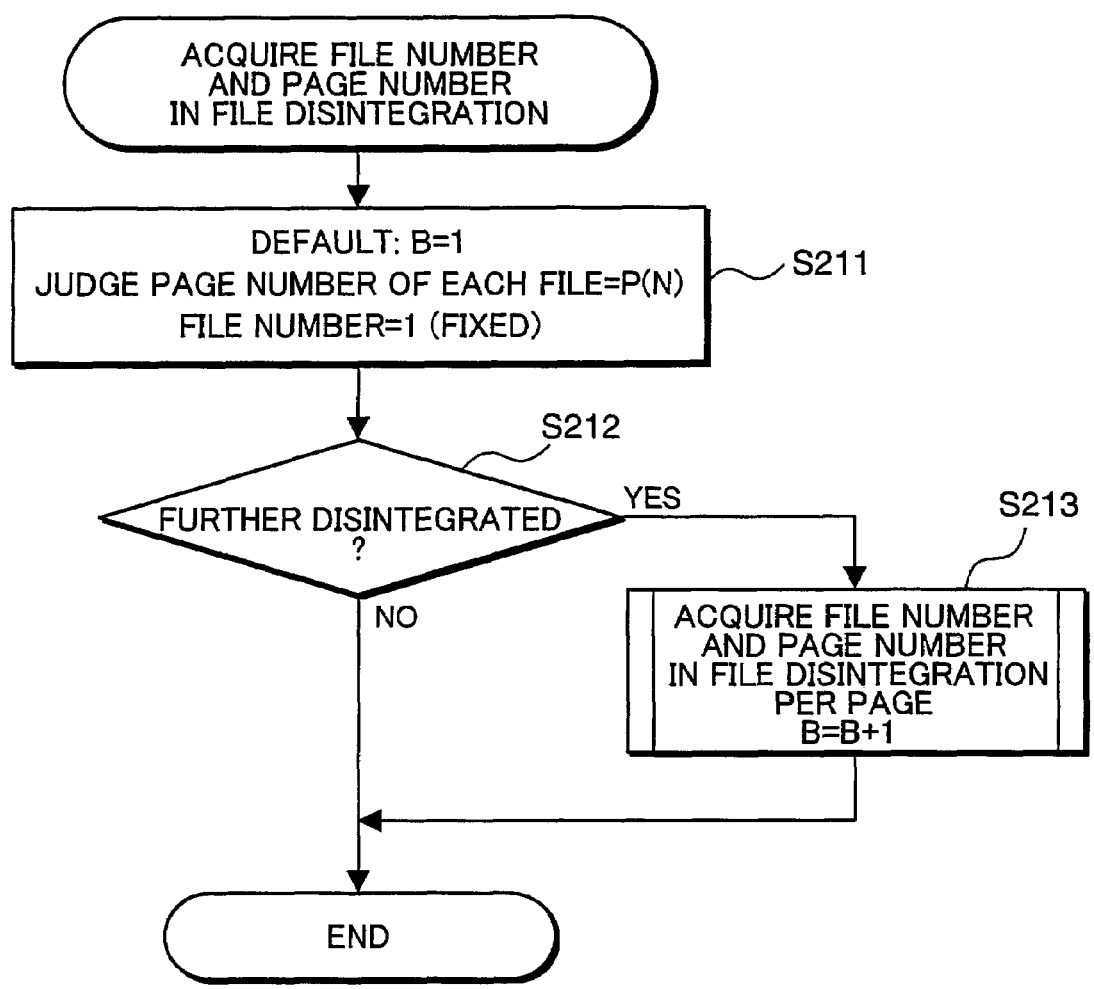
FIG. 7 is a flowchart showing a processing of acquiring information relating to page numbers of respective files constituting a file group in file disintegration processing.

In the following, described is the processing of acquiring information relating to the page numbers of respective files constituting the file group, referring to the flowchart shown in FIG. 7 in the case where the file disintegration processing is implemented if the file group consists of a plurality of files. In the case where the file disintegration processing is implemented with respect to a file group consisting of a plurality of files, the default is set at B=1, and the respective numbers of pages P(N) of files constituting the file group are judged (Step S211). At this stage, the file number is fixed to 1. If a further file disintegration processing is implemented with respect to the file after the file disintegration processing (YES in Step S212), namely, if a single file is disintegrated into pages, the default is set at B=B+1, and the processing of acquiring information relating to the file number and the page number of the file group, which is specific to the file disintegration processing, is implemented (Step S213).

Figure 8:
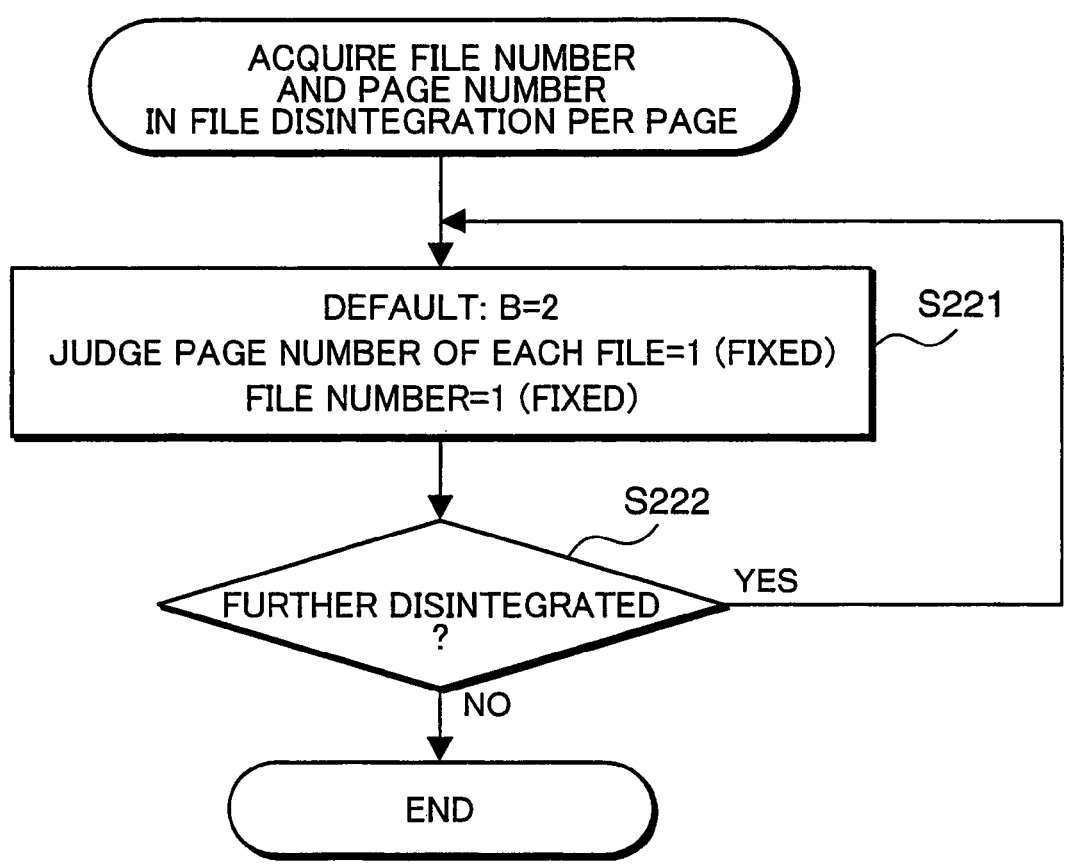
FIG. 8 is a flowchart showing a processing of acquiring information relating to respective pages of a file in disintegrating a single file into pages.

In the following, described is a processing of acquiring information relating to respective pages of a file in the case of implementing the file disintegration processing of disintegrating a single file into pages, referring to the flowchart shown in FIG. 8. In case of disintegrating a file into pages, namely, if the default B=2, the file is disintegrated into a certain number of pages. Accordingly, the page number and the file number is fixed to 1 (Step S221). If a further disintegration processing is implemented with respect to the file which has been disintegrated into pages (YES in Step S222), the processing of S221 is repeated. Thereby, information relating to the page number and the file number is acquired in a similar manner as in the previous file disintegration processing.

Figure 9:
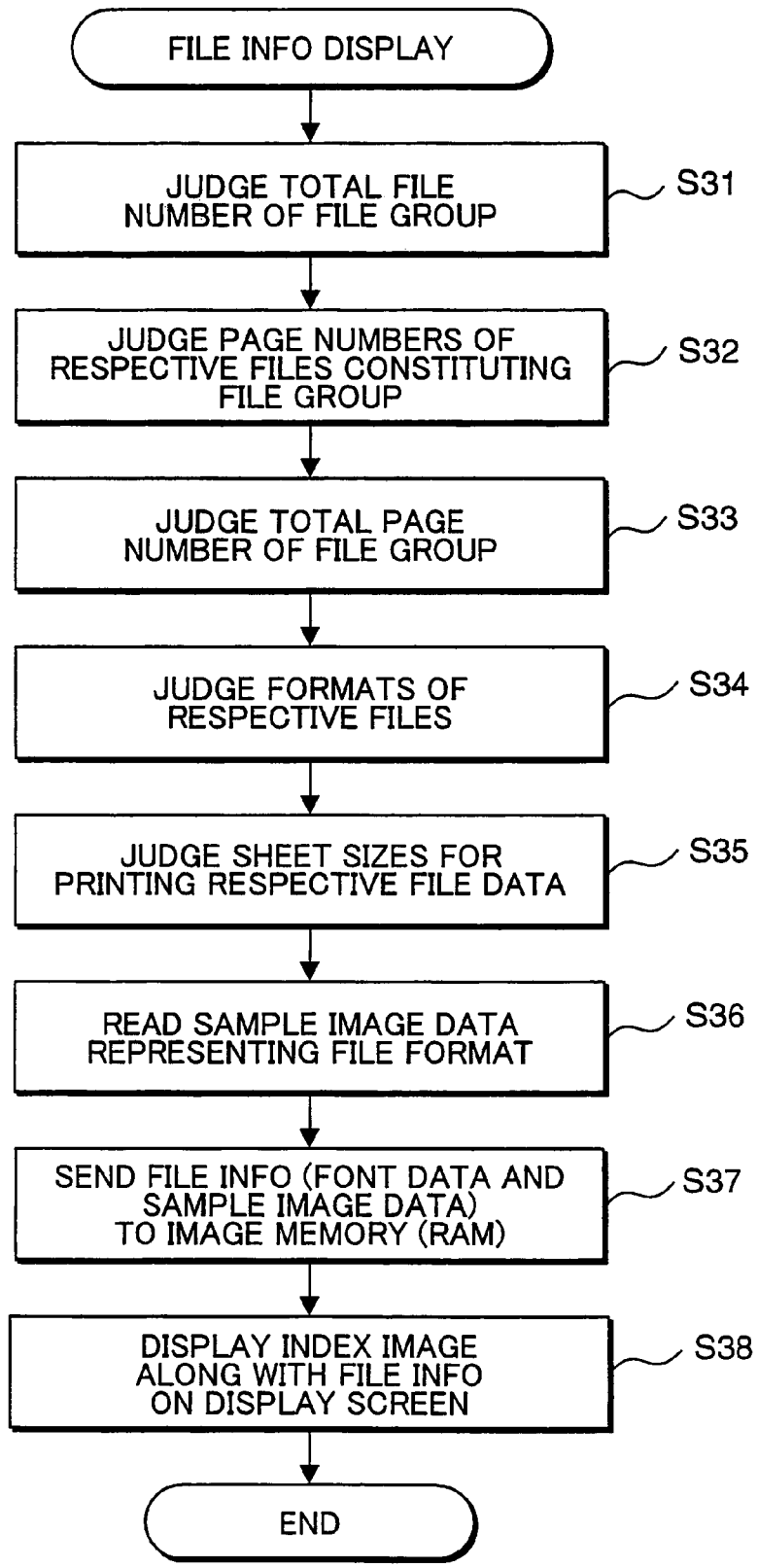
FIG. 9 is a flowchart showing a processing of displaying file information relating to a file group.
Figure 10:
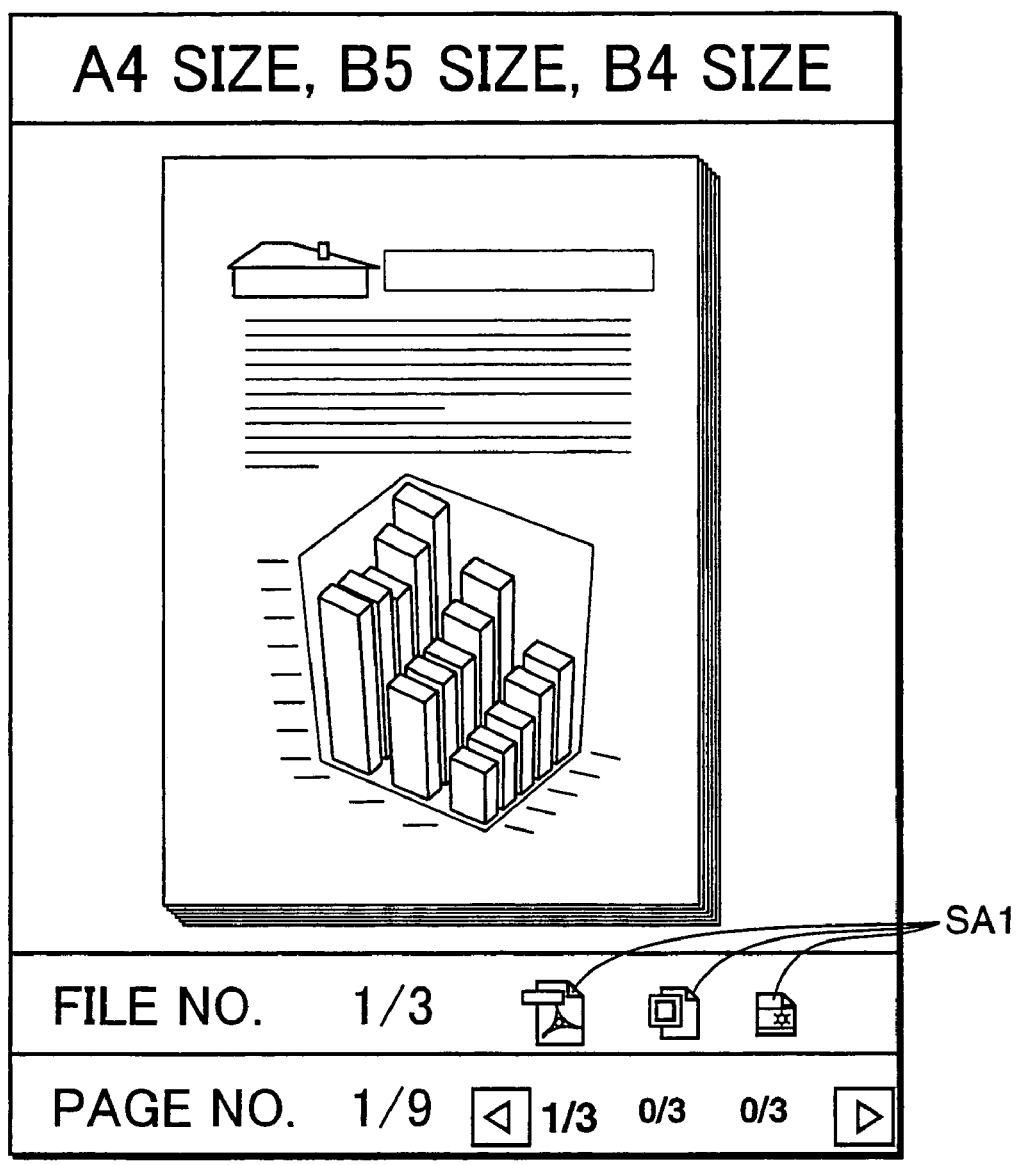
FIG. 10 is a diagram showing an example of an index image along with file information being displayed.

Next, a processing of displaying file information relating to a file group is described with reference to FIGS. 9 and 10. FIG. 9 is a flowchart showing the processing, and FIG. 10 is a diagram showing an example of screen image displaying an index image along with file information. In the case where a plurality of files are integrated into a file group, file information relating to the total number of files constituting the file group, the total number of pages of the file group, and the page numbers of respective files are displayed along with the index image representing the file group. In case of displaying the file information, the total number of files of the file group, which is calculated according to the flowchart of FIG. 6, is judged (Step S31), the numbers of pages of respective files constituting the file group are judged (Step S32), and the total number of pages of the file group is judged (Step S33).

Subsequently, judged are the types or formats of respective files constituting the file group, such as the kind or name of the software application suitable to open the relevant file, and the sizes of the sheets for printing respective file data, which are designated with respect to the respective files (Steps S34, S35). Then, a sample image representing the format of each file is read from the sample image data stored in the image displaying program (Step S36). Thereafter, file information such as font data (e.g. alphanumerical character which makes it possible for a user to easily recognize the total file number, the total page numbers of respective files, the total page number of the file group, and the sizes of the sheets for printing respective file data) and sample image data representing the format of each file is transmitted to the RAM or image memory 5, (Step S37). Then, the file information is displayed along with the index image on the display device 7 (Step S38). The above sequence of operations is implemented with respect to all the file groups stored in the storage device 6 or the like.

In the case of displaying an index image representing the first page of the first file of a file group consisting of three files as shown in FIG. 10, for example, the indication "FILE NO. 1/3" below the index image notifies a user of the total number of the files of the file group, as well as the file number of the file containing the page represented by the on-screen index image, thereby specifying the file number in the total file number. Further, let's say that the total page number of the file group is nine. Then, the indication "PAGE NO. 1/9" notifies the user that the page represented by the on-screen index image corresponds to the first page of the file group. The indication "1/3 0/3 0/3" along with the indication "PAGE NO. 1/9" notifies the user that each file consists of three pages, and the page represented by the on-screen index image corresponds to the first page of the first file of the file group. The sizes of the sheets for printing the respective file data are displayed in an upper region above the on-screen index image.

Figure 11:
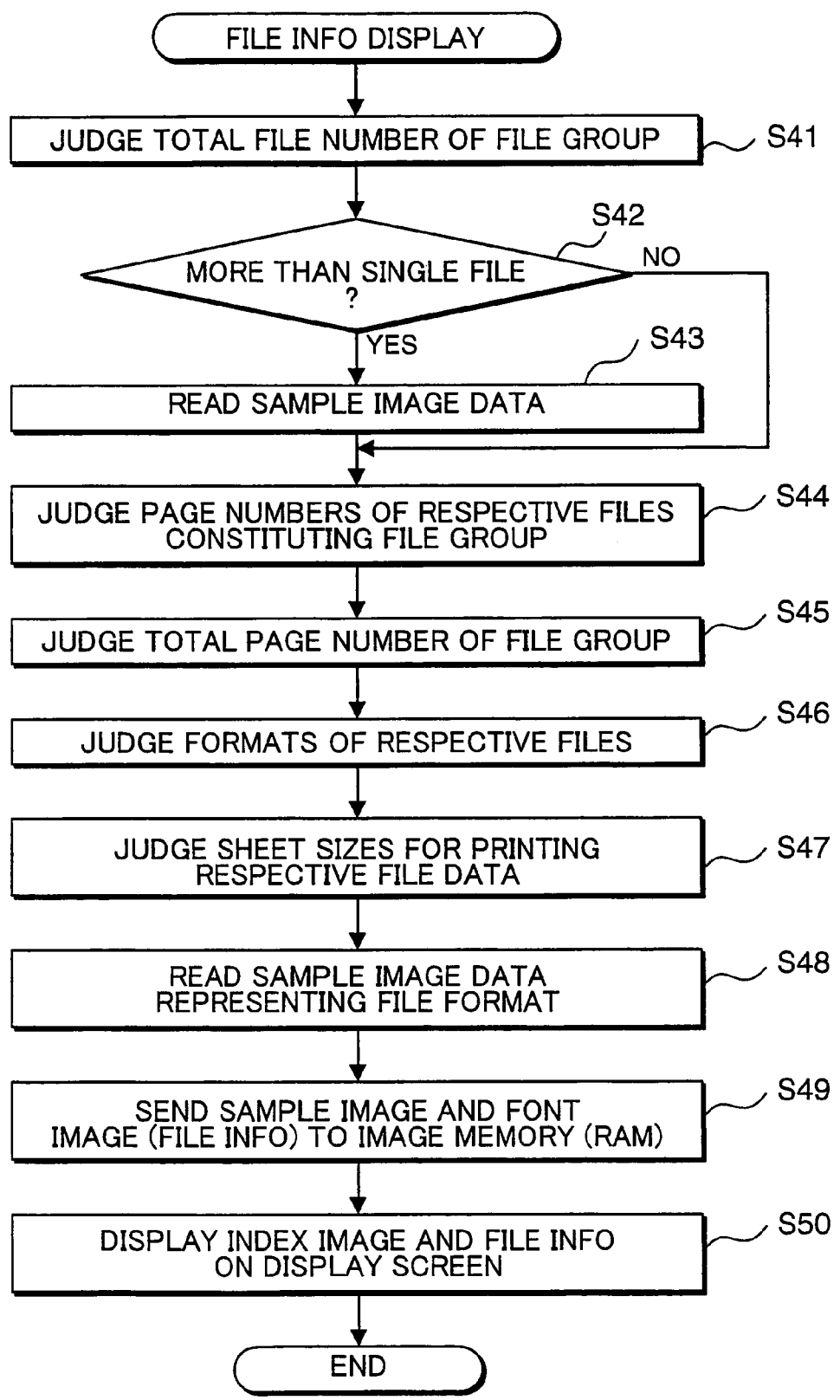
FIG. 11 is a flowchart showing a modified processing of displaying file information relating to a file group.
Figure 12:
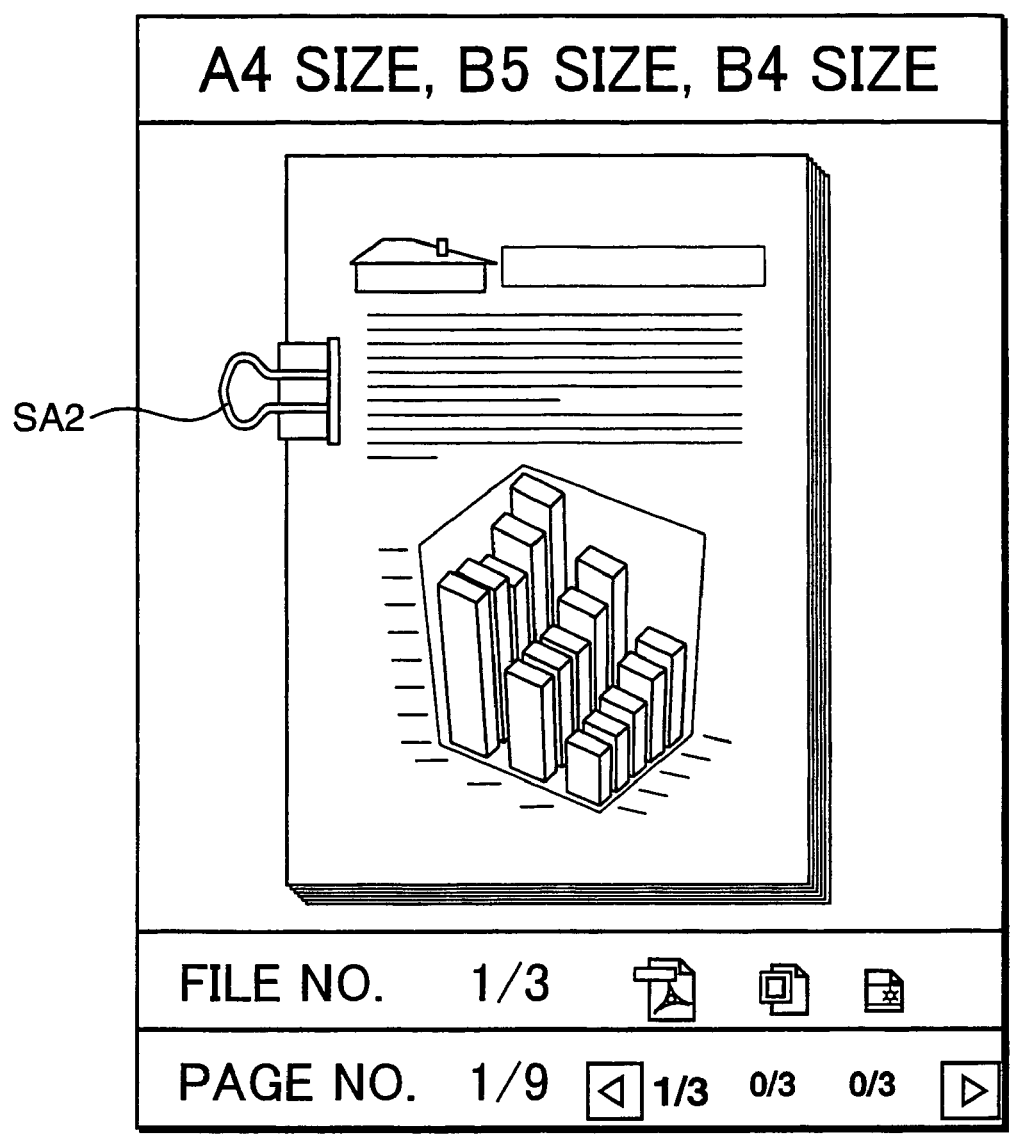
FIG. 12 is a diagram showing an example of an index image along with file information acquired according to the processing in FIG. 11 being displayed.

Next, described is a modified processing of displaying file information relating to a file group with reference to FIGS. 11 and 12. FIG. 11 is a flowchart showing the processing, and FIG. 12 is a diagram showing an example of a screen image displaying an index image along with file information according to the modification. It should be appreciated that elements in the following modifications which are identical to those in the above embodiment are denoted at the same reference numerals, and description on the modified processing identical to the file information displaying processing shown in FIG. 9 will be omitted herein.

In the modified file information displaying processing, it may be possible to display, along with an index image, a sample image which clearly notifies a user that a file group represented by the on-screen index image consists of a plurality of files. In the modification, the following operations are implemented. After judging the total file number of a file group in Step S41, it is judged whether the total file number is plural (Step S42). If it is judged that the total file number is plural (YES in Step S42), then, sample image data (e.g. data corresponding to an image such as a clip) is read from a sample image data storage device to clearly notify the user that the file group consists of a plurality of files (Step S43). Next, the sample image data is sent to a RAM 5 (image memory) along with font data (Step S49), and the index image along with the file information (sample image and font data) is displayed on a display device 7 (Step S50).

Figure 13:
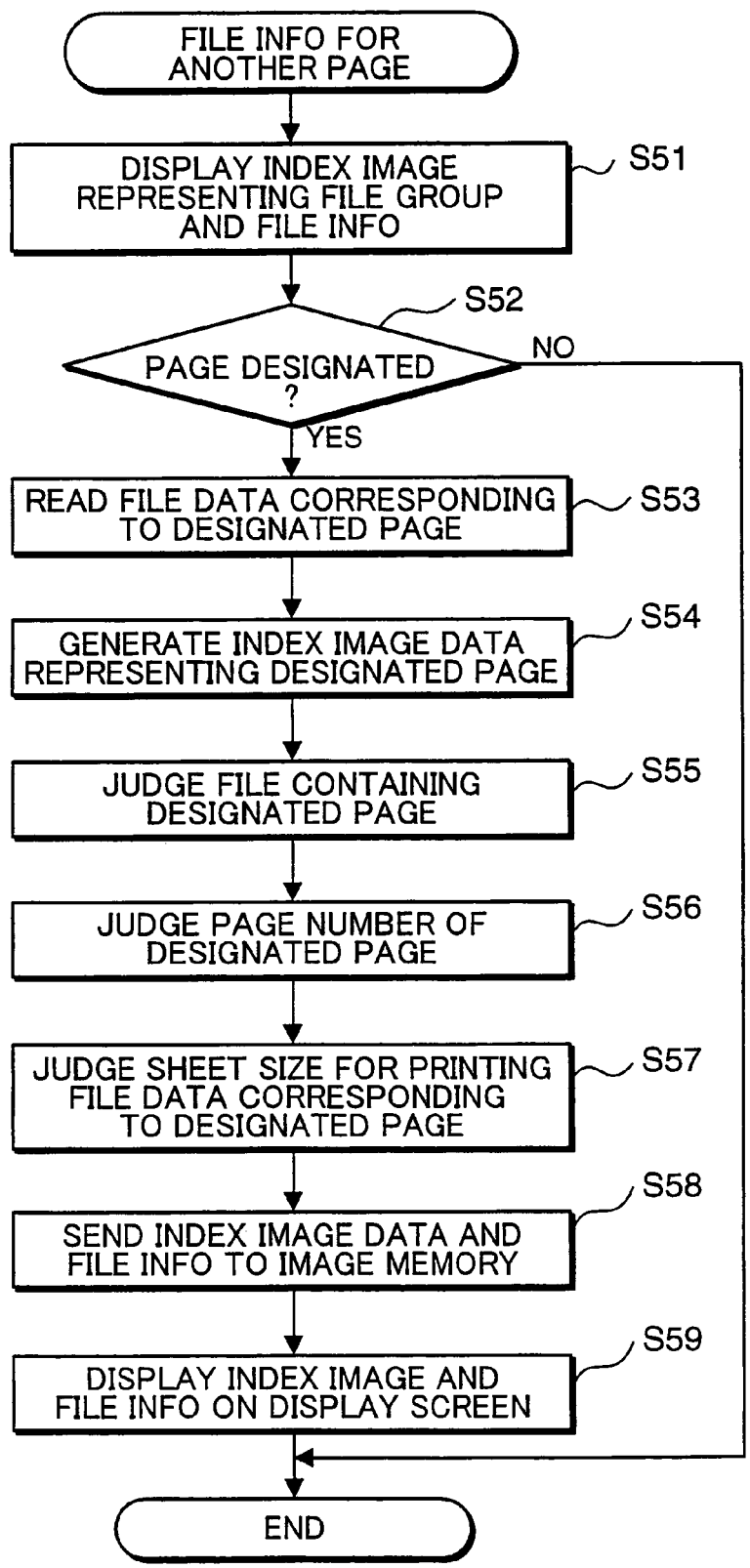
FIG. 13 is a flowchart showing a processing of displaying another index image together with file information.
Figure 14:
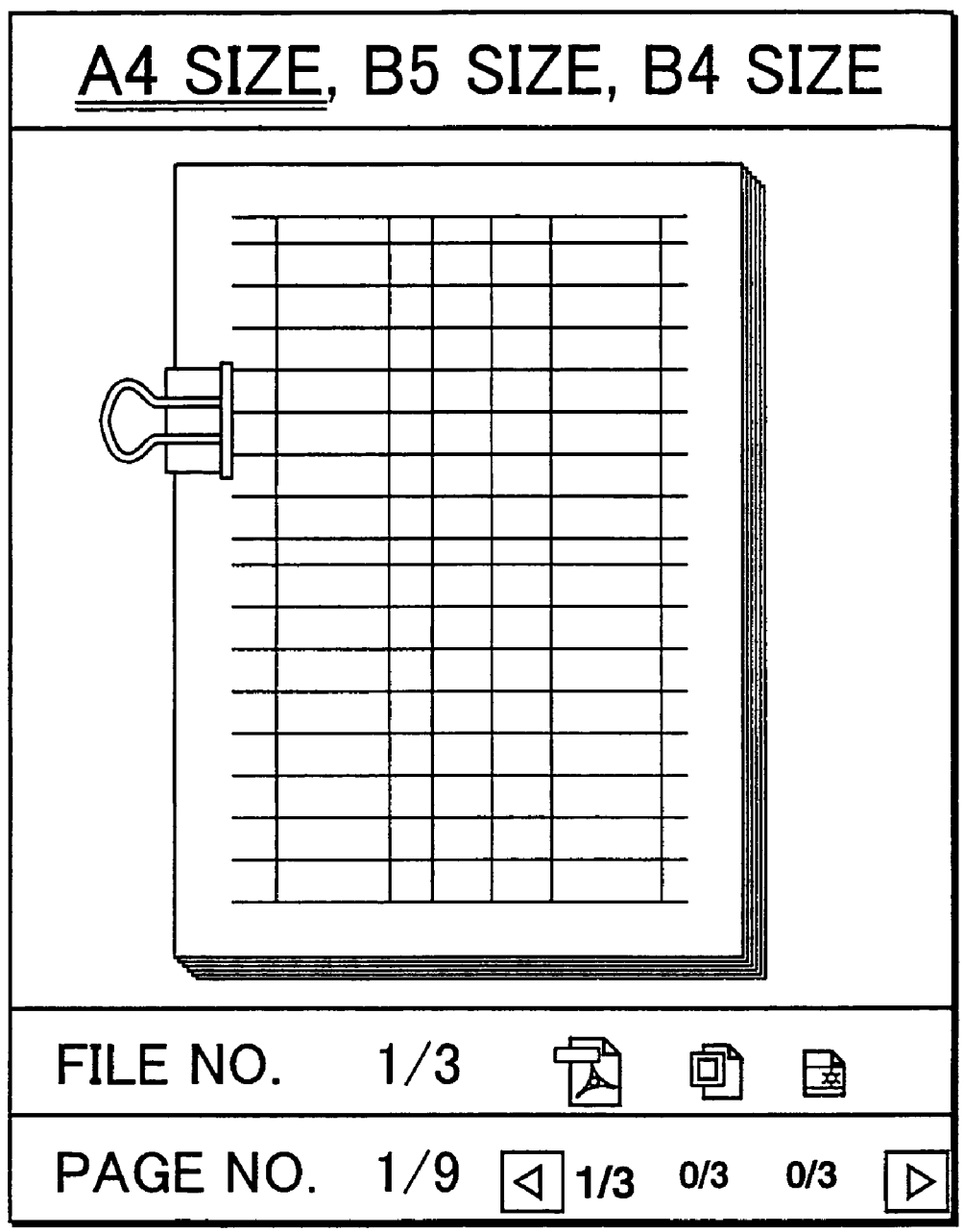
FIG. 14 is a diagram showing an example of another index image along with file information.

Next, described is a processing of displaying an index image of another page of one of files constituting a file group with reference to FIGS. 13 and 14. FIG. 13 is a flowchart showing another index image display processing, and FIG. 14 is a diagram showing an example of a screen image displaying another index image along with file information as processed according to the index image display processing. Referring to FIG. 13, first, displayed is an index image representing a file group consisting of a plurality of files, along with file information (Step S51). When a user designates a page number in the file group by e.g. clicking on either one of the leftward and rightward arrow keys (see FIG. 12) shown on the right of the page number and below the index image, with a mouse pointer or the like (YES in Step S52), the file data corresponding to the designated page is read from a storage device 6 or the like (Step S53), and index image data representing the designated page is generated (Step S54).

Subsequently, acquired is font data such as information relating to the file to which the designated page belongs, the page number of the designated page in the file, and the sheet size for printing the file data (Steps S55, S56, S57). Then, file information (font data and sample image data) such as information relating to the file to which the designated page belongs, the page number of the designated page in the file, the size of the sheet for printing the file data, and the page number of the designated page throughout the file group are sent to the RAM 5 (image memory) along with the index image data (Step S58). Thereafter, an index image and file information respectively corresponding to the newly sent index image data and file information are displayed, in place of the previously displayed index image and file information (Step S59).

As shown in FIG. 14, in the case where an on-screen index image represents the first file of a file group consisting of three files, the indication "FILE NO. 1/3" below the on-screen index image notifies a user of the total file number and the file number of the file containing the relevant page represented by the on-screen index image at a first glance. Namely, the indication facilitates the user to specify the file by displaying the file number throughout the total file number.

In the case where the total page number of the file group is nine and the page represented by the on-screen index image is the first page throughout the file group, the indication "PAGE NO. 1/9" is displayed. Further, if each file consists of three pages, the indication "1/3 0/3 0/3" is displayed along with the indication "1/9". With this display, the user is notified at a first glance that the on-screen index image represents the first page of the first file of the file group. The sizes of the sheets for printing respective file data are displayed in such a manner that the relevant size of the sheet for printing the file data containing the page designated in Step S52 is displayed in a highlighted manner (e.g. see the underlined size in the upper region above the index image in FIG. 14) so that the user can easily recognize the sheet size. The indications (numerical values) in the sections of file number and page number are changed (incremented or decremented) as the page is designated.

In the image displaying program and image displaying apparatus, the data reader 21 reads out information relating to the file number of the file to which the page represented by the on-screen index image belongs, and the page number of the relevant page in the file in response to display of index images in the form of a page under the control of the image display controller 27. Further, in display of the index image, the image display controller 27 causes the display device 7 to display file information relating to the file to which the page represented by the on-screen index image belongs, and the page number of the page represented by the index image in the file. With such an arrangement, the user can easily grasp the page number of the relevant page represented by the on-screen index image in the file (and throughout the file group), as well as the file number in the file group at a first glance of the screen of the display device 7. Thus, the user can easily grasp the detailed contents of respective files (file information relating to respective files).

The present invention is not limited to the foregoing embodiments and can take various modifications and alterations. In the embodiment, all the types of the files constituting a file group are judged, and sample images representing all the types of the files are displayable. Alternatively, it is possible to judge and display merely the type of the file to which the page represented by the on-screen index image belongs.

In the embodiment, all the possible sizes of sheets for printing all the file data constituting a file group are judged and displayed along with an index image. Alternatively, it is possible to judge and display merely the sheet size adapted to print file data containing the page represented by the on-screen index image.

In the embodiment, judged and displayed is the page number of the page represented by the on-screen index image throughout the file group. Alternatively, it is possible to judge and display the page number in the file containing the relevant page represented by the on-screen index image.

In the embodiment, the sample image and the file number throughout the file group are displayed so that the user is allowed to identify the file to which the relevant page represented by the on-screen index image belongs. Alternatively, other display manner may be applicable such as display of a file name and the name of a software application for opening the file.

In the embodiment, index images of respective files constituting a file group are displayed in the form of a page if the file group consists of a plurality of files, and file information in association with the on-screen index image is displayed. Alternatively, the same operation may be implemented with respect to a file group consisting of a single file.

In the embodiment, the sizes of the sheets for printing respective files constituting a file group are judged, and the judged sheet sizes are displayed along with an index image. Alternatively, in the case where different sheet sizes are adopted with respect to respective pages in each file, it may be possible to judge the sizes of the sheets in the form of a page in each file and to display the relevant sheet size along with a corresponding index image.

File information to be displayed along with an index image is not limited to the foregoing embodiment, and other various information relating to a file may be displayable.

As described above, an inventive image displaying program product comprises: a signal bearing media bearing a program which causes a computer to function as: a file group generating means which links a plurality of files stored in a storage medium to one another to generate a group of files; an index image generating means which generates index images representing files constituting the file group; an index image displaying means which displays an index image in the form of a page with respect to each of the files constituting the file group; a file judging means which judges a file in connection with the displayed index image; a page judging means which judges what number the page corresponding to the displayed index image is with respect to a predetermined reference; and a file information displaying means which displays file information relating to the file judged by the file judging means and the page number judged by the page judging means on the display device together with the displayed index image.

Also, an inventive image displaying apparatus comprises: file group generating means for linking a plurality of files stored in a storage medium to one another to generate a group of files; index image generating means for generating index images representing files constituting the file group; index image displaying means for displaying an index image in the form of a page with respect to each of the files constituting the file group; file judging means for judging a file in connection with the displayed index image; page judging means for judging what number the page corresponding to the displayed index image is with respect to a predetermined reference; and file information displaying means for displaying file information relating to the file judged by the file judging means and the page number judged by the page judging means on the display device together with the displayed index image.

With this construction, the file judged by the file judging means and the page number judged by the page judging means are displayed on the display device together with the displayed index image. The user can grasp the contents of the file and the file group easily.

The predetermined reference may be the total pages throughout the file group, the total pages of the file in connection with the displayed index image, or both the total pages throughout the file group and the total pages of the file in connection with the displayed index image. The page of the displayed index image can be recognized with respect to the file group and/or the file.

The program may cause the computer to further function as a file type judging means which judges a type of the file in connection with the displayed index image based on attribute data attached to the file. In this case, the file information displaying means displays the file type judged by the file type judging means together with the displayed index image. The type of the file can be recognized together with the displayed index image.

The program may cause the computer to further function as a sheet size judging means which judges a sheet size of the file in connection with the displayed index image based on attribute data attached to the file. In this case, the file information displaying means displays the sheet size judged by the sheet size judging means together with the displayed index image. The sheet size of the file can be recognized together with the displayed index image.

The program may cause the computer to further function as a file number judging means which judges the total number of the files constituting the file group, and a sample image generating means which generates a sample image representing that the file group consists of a plurality of files, and wherein the file information displaying means displays the generated sample image together with the index image when the file number judging means judges that the file group consists of a plurality of files. Thank to the sample image, the user can easily see that the file group consists of a plurality of files.

This application is based on Japanese Patent Application No. 2002-308789 filed on Oct. 23, 2002, respectively, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image displaying program product for use with a computer comprising:
   a computer storage medium having a program embodied therein which causes the computer to function as:
   a file group generating means which links a plurality of files stored in a storage medium to one another to generate a file group;
   an index image generating means which generates index images representing files constituting the file group, each index image being in the form of a specified page of each file;
   an index image displaying means which displays a generated index image;
   a file judging means which judges a file in connection with the displayed index image;
   a page judging means which judges what number the page corresponding to the displayed index image is with respect to a predetermined reference, wherein the predetermined reference is the total pages throughout the file group and the total pages of the file in connection with the displayed index image;
   a file number judging means which judges the total number of the files constituting the file group;
   a sample image generating means which generates a sample image representing that the file group consists of a plurality of files;
   a file information displaying means which displays file information relating to the file judged by the file judging means and the page number judged by the page judging means on a display device together with the displayed index image; and
   a designation receiver for receiving designation of a page from a user; wherein:
   the index image generating means generates an index image representing a designated page in response to receiving designation of the page from the designation receiver, wherein the index image is a single index image representing the plurality of files of the file group, and
   the program further causes the computer to function as a file type judging means which judges a type of each file constituting the file group based on attribute data attached to each file so that the file information displaying means displays at any one time, together with the index image representing the page designated by the user via the designation receiver, all images showing respective software applications suitable for opening the files in the file group, and wherein the file information displaying means displays an image showing which kind of software application is suitable for opening the image being displayed as the index image generated by the index image generator based on the designated page when all of the images showing the respective software applications is displayed and the file information displaying means simultaneously displays a page number of the displayed index image with respect to the total pages throughout the file group, a page number of the displayed index image with respect to the total pages of the file in connection with the displayed index image and the generated sample image together with the index image when the file number judging means judges that the file group consists of a plurality of files.

2. The image displaying program product according to claim 1, wherein the program causes the computer to further function as a sheet size reading means which reads a sheet size of the file in connection with the displayed index image based on attribute data attached to the file, and wherein the file information displaying means displays the sheet size read by the sheet size reading means together with the displayed index image.

3. An image displaying apparatus comprising:
   file group generating means for linking a plurality of files stored in a storage medium to one another to generate a group of files;
   index image generating means for generating index images representing files constituting the file group;
   index image displaying means for displaying an index image in the form of a page with respect to each of the files constituting the file group;
   file judging means for judging a file in connection with the displayed index image;
   page judging means for judging what number the page corresponding to the displayed index image is with respect to a predetermined reference, wherein the predetermined reference is the total pages throughout the file group and the total pages of the file in connection with the displayed index image;
   sheet size judging means for judging a sheet size of the file in connection with the displayed index image based on attribute data attached to the file;
   file information displaying means for displaying at any one time file information relating to the file judged by the file judging means and the page number judged by the page judging means on the display device together with the displayed index image; and
   a designation receiver for receiving designation of a page from a user; wherein:
   the index image generating means generates an index image representing a designated page in response to receiving designation of the page from the designation receiver, wherein the index image is a single index image representing the plurality of files of the file group, and
   the image displaying apparatus further includes file type judging means for judging a type of each file constituting the file group based on attribute data attached to each file so that the file information displaying means displays at any one time, together with the index image representing the page designated by the user via the designation receiver, all images showing respective software applications suitable for opening each file in the file group, and wherein the file information displaying means displays an image showing which kind of software is suitable for opening the image being displayed as the index image generated by the index image generator based on the designated page when all of the images showing the respective software applications is displayed and the file information displaying means simultaneously displays a page number of the displayed index image with respect to the total pages throughout the file group, a page number of the displayed index image with respect to the total pages of the file in connection with the displayed index image and the sheet size judged by the sheet size judging means together with the displayed index image.

4. The image displaying apparatus according to claim 3, further comprising file number judging means for judging the total number of the files constituting the file group, and a sample image generating means which generates a sample image representing that the file group consists of a plurality of files, and wherein the file information displaying means displays the generated sample image together with the index image when the file number judging means judges that the file group consists of a plurality of files.

5. The image displaying apparatus according to claim 3, further comprising a sample image generator that causes the information displaying means to display, together with the index image, an image showing that the files shown as the index image and representing the files constituting the file group consists of a plurality of files.

6. An image displaying program product for use with a computer comprising:
- a computer storage medium having a program embodied therein which causes the computer to function as:
- a file group generating means which links a plurality of files stored in a storage medium to one another to generate a group of files;
- an index image generating means which generates index images representing files constituting the file group, each index image being in the form of a specified page of each file;
- an index image displaying means which displays a generated index image;
- a file judging means which judges a file in connection with the displayed index image;
- a page judging means which judges what number the page corresponding to the displayed index image is with respect to a predetermined reference, wherein the predetermined reference is the total pages throughout the file group and the total pages of the file in connection with the displayed index image;
- a file type judging means which judges a type of each file constituting the file group based on attribute data attached to each file;
- a sheet size judging means for judging a sheet size of each file constituting the file group based on attribute data attached to each file;
- a file information displaying means which displays file information relating to the file judged by the file judging means and the page number judged by the page judging means on a display device together with the displayed index image; and
- a designation receiver for receiving designation of a page from a user; wherein:
- the index image generating means generates an index image representing a designated page in response to receiving the designation of the page from the designation receiver, wherein the index image is a single index image representing the plurality of files of the file group, and
- the program further causes the computer to function so that the file information displaying means displays at one time, together with the index image representing the page designated by the user via the designated receiver, all images showing respective software applications suitable for opening the files in the file group, and information showing which kind of software application is suitable for opening the image being displayed as the index image generated by the index image generator based on the designated page when all of the images showing the respective software applications is displayed and the file information displaying means simultaneously displays a page number of the displayed index image with respect to the total pages throughout the file group, a page number of the displayed index image with respect to the total pages of the file in connection with the displayed index image and a sheet size for printing each file of the file group.

* * * * *